July 1, 1958 J. H. PARKS ET AL 2,841,000
RESILIENT GEAR
Filed Sept. 6, 1955
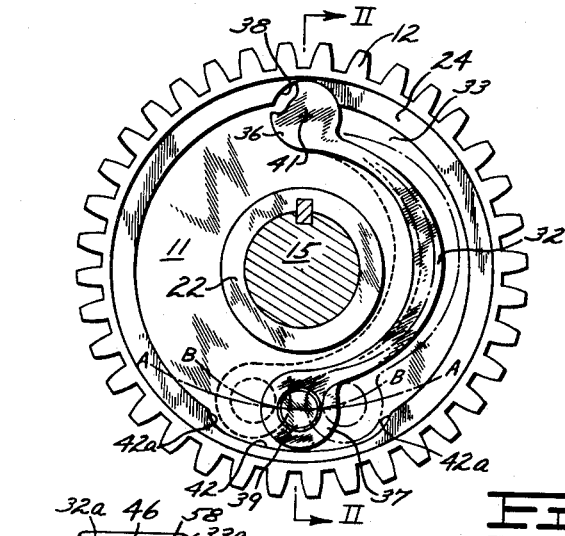
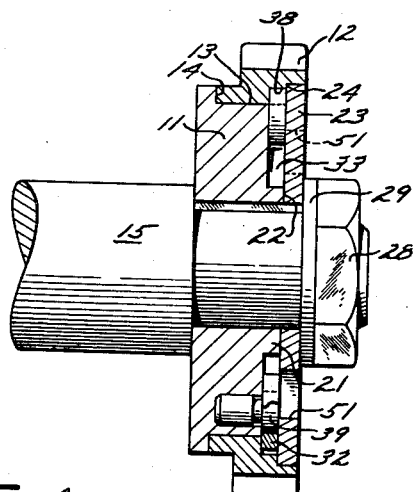
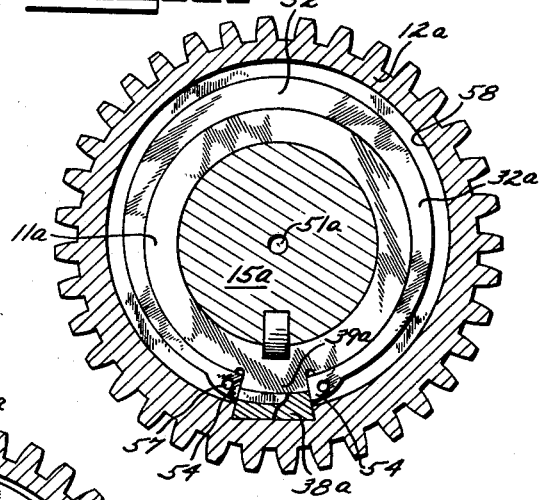
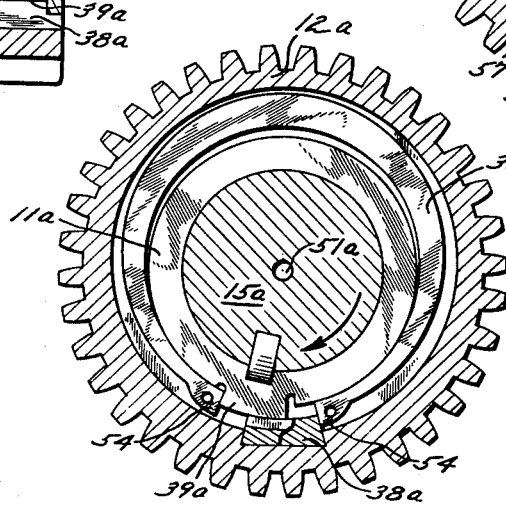
INVENTORS
JOHN H. PARKS
ROLLIN P. VAN ZANDT
BY
*Fryer and Johnson*
ATTORNEYS

2,841,000
RESILIENT GEAR

John H. Parks and Rollin P. van Zandt, Peoria, Ill., assignors to Caterpillar Tractor Co., Peoria, Ill., a corporation of California Application September 6, 1955, Serial No. 532,633

3 Claims. (Cl. 64—27)

The present invention relates generally to resilient couplings and drive members and relates particularly to a resilient drive-gear structure. This invention may be applied to the timing gear train of an internal combustion engine wherein cyclic irregularities develop vibrations, which may result in damage to the drive elements, and particularly to the gear teeth.

The invention may also be applied to the governor drive of an internal combustion engine for the purpose of isolating or damping the governor from the whipping and vibrations developed in the cam shaft and gear train of the engine. Other uses will be apparent from an understanding of the invention as it is described in the following specification. Generally, the gear of this invention comprises a hub member and a toothed ring member mounted for limited relative rotation therewith. Resilient means in the form of a solid arcuate spring is supported at its ends on anchoring means connected with each of said gear members to absorb torsional loads imparted to either of said members.

Many resilient drive gears are known to the art, which utilize radially or tangentially disposed coil springs or resilient material co-acting between separate gear components to absorb torsional loads when one gear member is moved relative to the other. An obvious disadvantage of such constructions is that their application is limited to larger gears, both axial and diametral, which precludes their use in many applications where space is limited.

An object of this invention is to provide a resilient drive member adapted for use in limited spaces. Another object of this invention is to provide a resilient drive gear whose physical dimensions are substantially the same as that of a standard (non-resilient) gear blank of equal capacity. A further object is to provide a resilient gear in which the resiliency is obtained by one or more solid arcuate springs connected at their opposite ends to relatively rotatable gear parts. Still another object is to provide a resilient spring-like member acting between the gear components wherein the spring deflection results in compressive and tensional distortion counteracting each other on either side of a neutral axis, substantially through the longitudinal center of the spring mass. Further and more specific objects are made apparent in the following specification wherein reference is made to the accompanying drawings.

In the drawings:

Fig. 1 is an elevational view, partly in section, of the gear structure of the present invention with parts removed showing the arrangement of the components thereof and the manner of their function;

Fig. 2 is a view in section taken substantially along the line II—II of Fig. 1;

Fig. 3 is a view in section similar to Fig. 2 showing a modification of the gear components;

Fig. 4 is a view in elevation similar to Fig. 1 with parts removed to show the arrangement of components in the modified gear of Fig. 3; and Fig. 5 is a view similar to Fig. 4 illustrating the condition obtaining under a torsional load and showing the manner in which the spring is stressed.

Referring to Figs. 1 and 2 of the drawings, a gear structure is disclosed as comprising a hub member 11 and a toothed ring member 12, mounted thereon for rotation about a common axis or shaft 15. Hub member 11 has a reduced diameter 13 forming an annular thrust face 14. Toothed member 12 is axially bored to provide a free running fit on the reduced diameter 13 of the hub member. Hub 11 is further provided with a second portion of reduced diameter 21 forming an annular thrust face 22. An end plate 23 keyed to shaft 15 abuts thrust face 22 and a shoulder 24 of member 12 permitting relatively friction-free rotation of members 11 and 23 with respect to member 12. A nut 28 and a washer 29 hold the end plate in place.

A resilient member in the form of a solid arcuate spring 32 is retained in a chamber 33 between the hub member 11 and plate 23. Suitable means are provided to support or anchor the ends of the spring 32 to gear members 11 and 12 so that the spring provides the sole torque transmitting drive connection between the respective gear members.

In Fig. 1, spring 32 is disclosed as an arcuate or C-shaped member having circular enlargements 36 and 37 on its ends. The enlargement 36 nests in a semi-circular seat 38 formed in member 12, while the other enlargement 37 is anchored on a pin 39 projecting from hub member 11 into chamber 33.

Limited rotational movement of hub member 11 relative to ring member 12 is permitted in response to torque loads or cyclic irregularities occurring as for instance in the gear train of an engine. When a torsional load transmitted through the drive shaft 15 is of a greater magnitude than the initial spring preload, the relative position of the gear members will change. This change in position causes the relative anchor positions to change resulting in deflection of spring 32. Because the end 36 of spring 32 is anchored to member 12, the end 37 tends to travel an arc A—A which is described about the center 41 of the seat 38. However, end 37, being retained on pin 39 is urged to travel an arc B—B, thereby compressively loading the spring 32. This phenomenon takes place whether the torque load is applied to member 12 or to member 11; or if the torque applied is in the opposite direction of rotation. A change in relative positions of the anchors 38 and 39 in either direction from normal will cause spring end 37 to travel the arc B—B, thereby compressively stressing the spring in either direction of load application.

An arcuate relief 42 formed in member 12 provides a working range for the end 37 of spring 32. The extremes 42a of relief 42 present positive abutments for spring end 37 in the event of excessive torsional loads to prevent damage to the spring and provide a solid drive for the interval of such excessive loads.

A modification is disclosed in Figs. 3, 4 and 5, wherein the gear has a hub member 11a and a toothed ring member 12a retained for relative rotation about a common axis or shaft 15a. In this instance the nurber 12a is retained in spaced relation to member 11a by two radially extending flange members 43 and 44, defining a chamber 33a between said members 11a and 12a.

A curved spring 32a comprising at least one, but herein disclosed as a plurality of flat C-shaped spring elements 46 are retained within chamber 33a initially stressed to engage key formations 38a and 39a carried by members 12a and 11a respectively. The gear assembly is completed by a thrust washer 29a and a nut 28a threaded to shaft 15a.

Curved spring 32a, as shown in Fig. 4, is formed with a thick section 52 intermediate its ends, and gradually diminishes in section toward both ends which are enlarged as at 54. These ends abut keys 38a and 39a. Suitable apertures 57 may be provided therein to receive a tool for the purpose of expanding the spring 32a for installation.

The initial preload of spring 32a provides sufficient thrust to retain keys 38a and 39a in register during low stress operation. However, when a high torsional load is transmitted through drive shaft 15a or when cyclic vibrations develop in the gear train, the keys are displaced from the normal position, stressing the spring 32a in a manner to absorb the shock of the load (see Fig. 5), thereby minimizing the possibility of damaging the gear teeth. When the load subsides, the spring returns the gear assembly to the normal low stress position illustrated in Fig. 4.

The abutting faces of the spring ends and the key members 38a and 39a are preferably formed on planes which are disposed radially of the gear assembly. This enables the application of direct forces between these members with a minimum tendency toward friction.

Suitable openings 51 in Fig. 2 or passages 51a in Fig. 3 may be provided to permit entry of lubricant into chambers 33 and 33a. If torque loads vary greatly, it may be desirable to dampen the movement of springs 46. To this end, chamber 33a may be furnished a supply of viscous fluid under pressure which would dampen resilience in proportion to the viscosity of the fluid.

Under normal operating conditions, the spring 32a will not contact the outer wall of chamber 33a in its response to cyclic vibrations and torsional loads. Should the torque load exceed normal expectations, the stressed spring may abut the wall of the chamber 33a, momentarily producing a solid drive directly through the spring. With spring 32a "bottomed" in the chamber, the increasing area of contact immediately causes a reduction in the effective length of the spring, thereby producing a stiffer, higher rate spring in response to high torque loads.

Due to the configuration of spring 32a, it may be desirable to machine the bores 58 and 59 of gear member 12a eccentrically of the bore 60, thereby providing a chamber which is disposed substantially concentric to the periphery of spring 32a and simultaneously increasing the wall thickness of member 12a where the key portion 38a is secured. In this instance, the flange members 43 and 44 are likewise made with matching eccentricity. In this manner, the gear assembly may be balanced by an equal distribution of the masses of the gear components, and eliminate the possibility of weak sections developing in the gear body.

Although this last mentioned modification is disclosed in Figs. 4 and 5, it is conceivable that where the wall section of the gear member is of adequate thickness, a concentric structure may be used by suitably counterbalancing the weight of the thicker sections of the spring 32a.

In either of the disclosed arrangements, torsional shock is absorbed by a resilient member in the form of a curved spring. In flexing a curved spring, the stresses therein are compressive and tensional, counter-acting each other on either side of a neutral axis substantially through the mass center of the curved spring. This theory provides a ratio of maximum spring force to minimum spring mass permitting a great reduction in physical dimensions in a resilient gear structure.

We claim:

1. A resilient drive structure for transmitting torque comprising a hub member rotatable about an axis, a toothed ring member mounted for rotation relative to said hub member, a key formation on said hub member, anchor means on said ring member in diametral opposed spaced relationship to said key and curved spring means acting between said key formation and said anchor means whereby the diametral distance between said key formations is reduced under influence of tangential torsional loads imposed upon either of said members, stressing the spring along a plane substantially through said axis.

2. A gear structure having a hub member rotatable about an axis, a toothed ring member mounted for rotation relative to said hub member, a chamber defined between said members, a key formation in one of said members within said chamber, anchor means on said other member disposed in diametral relationship to said key formation, and a solid curved spring with its ends engaging said key formation and anchor means whereby angular displacement of the relative positions of said key formations shortens the distance therebetween and compressively stresses said spring in either direction of displacement from normal.

3. A gear structure having a hub member rotatable about an axis, a toothed ring member mounted for rotation relative to said hub member, a chamber defined between said members, a key formation in one of said members within said chamber, anchor means on said other member disposed in diametral relationship to said key formation, a solid curved spring with its ends engaging said key formation and anchor means whereby angular displacement of the relative positions of said key formations shortens the distance therebetween and compressively stresses said spring in either direction of displacement from normal, and means formed in one of said members adjacent the key formation in the other member presenting a solid abutment in response to excessive displacement of the relative key positions caused by peak torsional loads.

References Cited in the file of this patent

UNITED STATES PATENTS

| 1,729,435 | Bethel | Sept. 24, 1929 |
| 1,735,105 | Bethel | Nov. 12, 1929 |
| 1,867,987 | Ruegg | July 19, 1932 |
| 2,090,203 | Hiltz | Aug. 17, 1937 |

FOREIGN PATENTS

| 708,284 | Germany | July 17, 1941 |